United States Patent Office 2,750,427
Patented June 12, 1956

2,750,427

HALOHYDROQUINONES AND PREPARATION THEREOF

Van R. Gaertner, Dayton, Ohio, assignor to Monsanto Chemical Company, St. Louis, Mo., a corporation of Delaware No Drawing. Application November 18, 1953,
Serial No. 393,003

12 Claims. (Cl. 260—623)

This invention relates to novel halohydroquinone compounds and to novel methods of preparing such compounds.

The halohydroquinones of the present invention are mono and di-eso-halo-1,4-hydroquinones having a cycloaliphatic ring fused thereto through adjacent carbon atoms of the hydroquinone nucleus. Such compounds can be represented by the formula

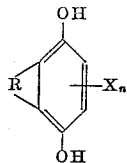

wherein

X is a halogen atom, $n$ is 1 or 2, and

R is an aliphatic radical.

R can be either a saturated or an unsaturated radical, can be either straight or branched chain, and can be substituted with polar substitutents.

The foregoing compounds are prepared according to the present invention by the reductive dehalogenation of a 5,6-dihydro-eso-polyhalo-1,4-benzoquinone having a cycloaliphatic ring fused thereto through adjacent saturated carbon atoms of the dihydrobenzoquinone nucleus. At least one of the halogen atoms must be in a position vinyl to the double bond of the benzoquinone and at least one of the halogen atoms must be an angular substituent in cis-relations to the other angular substituent. These latter compounds can be represented by the formula

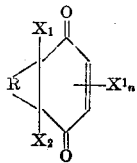

wherein $X_1$ is a halogen atom, $X_2$ is a halogen or hydrogen atom in cis-relationship to $X_1$, $X^1$ is a vinyl halogen, $n$ is 1 or 2, and R is an aliphatic group.

Examples of suitable dihydrobenzoquinone reactants for reduction to the halohydroquinones of the present invention are 2,4a-dichloro-4a,5,8,8a-tetrahydro-1,4-naphthoquinone; 2,4a-dichloro-6-methyl-4a,5,8,8a-tetrahydro-1,4-naphthoquinone; 4a,5,8,8a-tetrahydro-2,4a,7-trichloro-1,4-naphthoquinone; 2,4a - dibromo-5,8-methano-4a,5,8,8a-tetrahydro-1,4-naphthoquinone; 2,8a - dichloro-7-methyl-4a,5,8,8a-tetrahydro-1,4-naphthoquinone; 2,3,4a,8a-tetrabromo-4a,5,8,8a-tetrahydro-1,4-naphthoquinone; etc.

The foregoing and other similar naphthoquinones can be readily obtained by a Diels-Alder reaction involving dienes and polyhalo-1,4-benzoquinones. Such a preparation is particularly useful because it utilizes readily available raw materials, can be easily carried out, and results in adducts which have angular substituents in cis-relationship to each other. Examples of suitable dienes for the preparation of such atoms are butadiene-1,3, n-pentadiene-1,3, isoprene, 2,3-dimethylpentadiene-1,3, chloroprene, or its bromo- or iodo-analogues, 2-ethylbutadiene-1,3, cyclopentadiene, gem-dichlorocyclopentadiene, 1-acetoxy-butadiene-1,3, and the like. Examples of polyhalo-1,4-benzoquinones suitable for adduct formation with the aforementioned dienes are chloranil, 2,3,5,6-tetrabromo-1,4-benzoquinone, 2,6 - dibromo-3,5-dichloro-1,4-benzoquinone, 2,5-dichloro-1,4-benzoquinone, 2,6-dichloro-1,4-benzoquinone and various other di-, tri- and tetrahalo-1,4-benzoquinones.

As was mentioned previously, the aromatic halohydroquinones of the present invention are prepared by the reduction of dihydropolyhalobenzoquinones. For example, 2,3,4a,8a - tetrachloro-4a,5,8,8a-tetrahydro-1,4-naphthoquinone can be readily reduced to give 2,3-dichloro-5,8-dihydro-1,4-naphthohydroquinone as indicated by the following reaction:

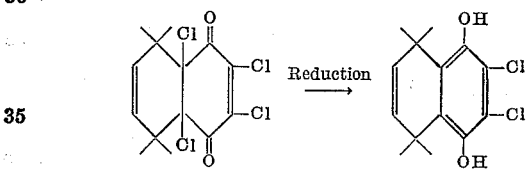

Particular attention is directed to the facts (1) that the angular chlorine atoms are in a cis-relationship to each other, in which relationship they would ordinarily be very difficult to remove and (2) that the other two (vinyl) halogen atoms are on beta carbon atoms of alpha, beta unsaturated carbonyl groups, and, consequently, would be expected to be more reactive than the angular chlorine atoms. In spite of the foregoing facts, the reduction of the particular compounds according to the present invention results in the removal of the cis-angular halogens in preference to either of the carbonyl-activated vinyl halogens.

As in most cases of reduction reactions, there can be considerable variation in the selection of reducing agents and conditions for carrying out the present reaction. For example, metals (e. g. zinc, iron, tin, etc.) with acids (e. g. acetic, hydrochloric, phosphoric, etc.), or alcohols (e. g. methanol, ethanol, propanol, etc.), molecular hydrogen (with catalysts such as palladium or platinum), sodium amalgam, and numerous other reducing systems can be utilized in the reaction of the present invention.

Further details relative to the products and processes involved in the present invention will be apparent from the following examples.

EXAMPLE 1

*Preparation of 2,3,4a,8a-tetrachloro-4a,5,8,8a-tetrahydro-1,4-naphthoquinone*

About 20 ml. of butadiene, 24.6 g. of chloranil and 80 ml. of solvent (benzene) were charged into a 300 ml. bomb which had been cooled in a Dry Ice-acetone mixture. The bomb was closed and heated at 100° C. for 48 hours with continuous rocking. After cooling for one day the bomb was vented, the charge was removed, and the unreacted chloranil was separated by filtration. The remaining benzene solution was treated with charcoal, concentrated by distillation and diluted with methanol to precipitate additional unreacted chloranil. Further removal of benzene (by distillation) and addition of methanol gave a solution from which crude nearly colorless adduct was allowed to crystallize. Recrystallization from methanol followed by sublimation at about 70° C. and 0.5 mm. Hg gave colorless prisms, M. P. 74.5–76.5° C. Analyses: calculated (as $C_{10}H_6O_2Cl_4$), C=40.04%, H=2.01%; found, C=40.32%, H=2.06%. The yield and conversion, based upon chloranil, were 86% and 35%, respectively.

EXAMPLE 2

*Preparation of 2,3,4a,8a-tetrachloro-4a,5,8,8a-tetrahydro-1,4-naphthoquinone. (Second method)*

The procedure of Example 1 was duplicated, except that the reaction was maintained at 110° C. for about 65 hours. Under these conditions a yield of 98% and a conversion of 73%, based upon chloranil, were obtained.

EXAMPLE 3

*Preparation of 2,3-dichloro-5,8-dihydro-1,4-naphthohydroquinone*

Three grams of 2,3,4a,8a-tetrachloro-4a,5,8,8a-tetrahydro-1,4-naphthoquinone prepared as in Examples 1 or 2 was dissolved in 25 ml. of glacial acetic acid, and 1.3 g. of zinc dust was added to the solution. Spontaneous exothermic reaction followed (temperature rising to 75° C.) with the formation of 2,3-dichloro-5,8-dihydro-1,4-naphthohydroquinone. This latter product was readily converted to 2,3-dichloro-1,4-naphthoquinone by oxidation with chromium trioxide.

EXAMPLE 4

*Preparation of 2,3-dichloro-5,6,7,8-tetrahydro-1,4-naphthohydroquinone*

Nine grams of 2,3,4a,8a-tetrachloro-4a,5,8,8a-tetrahydro-1,4-naphthoquinone in a solution of 100 ml. of glacial acetic acid and 5 ml. of water, and 1 g. of 10% palladium-on-charcoal catalyst were placed in a low pressure hydrogenation apparatus and charged with hydrogen at a pressure of 29.5 lbs. per square inch and allowed to react for about 20 minutes at a temperature of 19° C. The reaction products were then removed from the apparatus, heated to dissolve a white crystalline solid which had precipitated during the hydrogenation, filtered to remove the catalyst, and cooled to precipitate the crude product as white needles, M. P. 94.5–98.5° C. Further purification by repeated crystallization from concentrated acetic acid solutions (with slight amount of water) and treatment with charcoal gave the 2,3-dichloro-5,6,7,8-tetrahydro-1,4-naphthohydroquinone, M. P. 123–125° C. Analyses: calculated ($C_{10}H_{10}O_2Cl_2$), C=51.53%, H=4.32%; found, C=51.62%, H=4.88%. The yield was about 84%, based upon the tetrachlorotetrahydroquinone.

EXAMPLE 5

*Preparation of 2,3-dichloro-5,8-dihydro-1,4-naphthohydroquinone. (Second method)*

Five grams of 2,3,4a,8a-tetrachloro-4a,5,8,8a-tetrahydro-1,4-naphthoquinone and 2.5 g. of zinc dust were placed in 30 ml. of ethyl alcohol and refluxed for 2 hours. The product was filtered to remove unreacted zinc and diluted with water to give better than 69% yield of crude 2,3-dichloro-5,8-dihydro-1,4-naphthohydroquinone, which was characterized by oxidation with chromic acid to give 2,3-dichloro-1,4-naphthoquinone.

EXAMPLE 6

*Preparation of 2,3-dichloro-5,8-dihydro-1,4-naphthohydroquinone. (Third method)*

Five grams of 2,3,4a,8a-tetrachloro-4a,5,8,8a-tetrahydro-1,4-naphthoquinone and 2.24 g. of iron-by-hydrogen were placed in 50 ml. of glacial acetic acid and heated to the boiling point. Solid crude 2,3-dichloro-5,8-dihydro-1,4-naphthohydroquinone precipitated almost immediately with a yield of better than 84%, based on tetrachlorotetrahydronaphthoquinone. Oxidation of the dichlorodihydronaphthohydroquinone with chromic acid gave 2,3-dichloro-1,4-naphthoquinone.

EXAMPLE 7

*Preparation of 2,3-dichloro-5,8-methano-5,6,7,8-tetrahydro-1,4-naphthohydroquinone*

Twelve and one-half grams of 5,8-methano-2,3,4a,8a-tetrachloro-4a,5,8,8a-tetrahydro-1,4-naphthoquinone and 0.5 g. of platinum oxide catalyst were added to 50 ml. of glacial acetic acid and introduced into a low pressure hydrogenation apparatus. The apparatus was charged with 31.3 lbs. per square inch of hydrogen at room temperature. Reaction started immediately, and after 39 minutes the pressure had dropped to 21.8 lbs. per square inch—corresponding to a utilization of approximately 3 moles of hydrogen per mole of methanotetrachlorotetrahydronaphthoquinone. The reaction mixture was then filtered to remove catalyst, diluted to 250 ml. with water and cooled in an ice bath to precipitate the crude product as white needles, M. P. 135–137° C. Further purification by repeated crystallization from carbon tetrachloride gave white crystalline 2,3-dichloro-5,8-methano-5,6,7,8-tetrahydro-1,4-naphthohydroquinone, M. P. 139–141° C. Analyses: calculated ($C_{11}H_{10}Cl_2O_2$), C=53.90%, H=4.11%; found, C=54.02%, H=4.40%. The yield was 98%, based upon methanotetrachlorotetrahydronaphthoquinone.

EXAMPLE 8

*Preparation of 2,3-dichloro-5,8-dihydro-5,8-methano-1,4-naphthohydroquinone*

Eight grams of 5,8-methano-2,3,4a,8a-tetrachloro-4a,5,8,8a-tetrahydro-1,4-naphthoquinone was placed in 100 ml. of glacial acetic acid and dissolved by heating to about 50° C. Two grams of zinc dust was added to the solution whereupon spontaneous exothermic reaction started and raised the temperature of the solution from 50° C. to 65° C. When the solution had cooled to about 60° C., an additional 2 g. of zinc dust was added, whereupon additional reaction raised the temperature to about 80° C. A third portion of 2 g. of zinc dust was added when the temperature had fallen to 70° C., but no further reaction was noted. The reaction mass was filtered to remove unreacted zinc dust, and then diluted with water to give better than 85% yield of 2,3-dichloro-5,8-dihydro-5,8-methano-1,4-naphthohydroquinone.

EXAMPLE 9

*Preparation of 6-methyl-2,3,4a,8a-tetrachloro-4a,5,8,8a-tetrahydro-1,4-naphthoquinone*

Nine grams of isoprene and 31 g. of chloranil were added to 300 ml. of benzene and heated to reflux temperature. After refluxing for 18 hours, an additional 3 ml. of isoprene was added. After an additional 6 hours, another 15 ml. of isoprene and 0.8 g. of trichloroacetic acid were added, and refluxing was continued for an additional 48 hours. The preparation was allowed to stand over night, after which unreacted chloranil was filtered therefrom. Concentration (by distillation) of the filtrate resulted in a further recovery of unreacted chloranil. Further concentration of the filtrate, followed by dilution with methanol, precipitated the crude product as black to tan prisms, M. P. 93.5–95.5° C. After recrystallization from methanol and further purification by sublimation at 80° C. and 0.5 mm. Hg, the 6-methyl-2,3,4a,8a-tetrachloro-4a,5,8,8a-tetrahydro-1,4-naphthoquinone was obtained as nearly colorless prisms, M. P. 96.5–98° C. Analyses: calculated ($C_{11}H_8O_2Cl_4$), C=42.07%, H=2.57%; found, C=42.19%, H=2.68%. The yield was 77% and the conversion was 42%, based on chloranil.

EXAMPLE 10

*Preparation of 6-methyl-2,3,4a,8a-tetrachloro-4a,5,8,8a-tetrahydro-1,4-naphthoquinone. (Second method)*

The yield and conversion for the reaction described in Example 9 were improved somewhat by allowing 24.6 g. of chloranil and 10 g. of isoprene in 80 ml. of benzene to react at 90° C. for about 90 hours in a closed bomb with continuous rocking. Under these conditions, a yield of 87% and a conversion of 81% were obtained.

EXAMPLE 11

*Preparation of 2,3-dichloro-dihydro-6-methyl-1,4-naphthohydroquinone*

Five grams of 6-methyl-2,3,4a,8a-tetrachloro-4a,5,8,8a-tetrahydro-1,4-naphthoquinone dissolved in 50 ml. of glacial acetic acid, and 18 g. of stannous chloride dihydrate dissolved in 18 ml. of concentrated hydrochloric acid were mixed together and heated to about 90° C. Upon cooling and dilution with water, the crude product precipitated as a solid white powder, soluble in dilute sodium hydroxide and melting, with decomposition at 112–114° C. Further purification by twice recrystallizing from carbon tetrachloride gave 2,3-dichloro-dihydro-6-methyl-1,4-naphthohydroquinone, M. P. 118–120° C. It is believed that this compound was the 5,6-dihydro compound. Analyses: calculated ($C_{11}H_{10}Cl_2O_2$), C=53.90%, H=4.11%; found, C=53.26%, H=4.44%. The yield was about 85%, based on methyltetrachlorotetrahydronaphthoquinone.

EXAMPLE 12

*Preparation of 2,3-dichloro-5,8-dihydro-6-methyl-1,4-naphthohydroquinone. (Second method)*

Nine and six-tenths grams of 6-methyl-2,3,4a,8a-tetrachloro-4a,5,8,8a-tetrahydro-1,4-naphthoquinone prepared as in Example 9 or 10, above, was dissolved in 50 ml. of methanol. One-half gram of 10% palladium-on-charcoal catalyst was added to the solution, the mixture charged to a low pressure hydrogenation apparatus, and hydrogen introduced to a pressure of 27.8 lbs. per square inch. Reaction started immediately and was allowed to continue at room temperature for about 1 hour, at which time the pressure had dropped 5 lbs. per square inch—which corresponded to a hydrogen utilization of about 2 moles per mole of methyltetrachlorotetrahydronaphthoquinone. The reaction products were removed from the reactor and filtered to remove catalyst. The filtrate was a clear homogeneous liquid from which, upon dilution with about 5 times its volume of water, crude 2,3-dichloro - 5,8-dihydro-6-methyl-1,4-naphthohydroquinone, precipitated in the form of off-white matted needles, M. P. 144–146° C. The yield was approximately 90%.

EXAMPLE 13

*Preparation of 2,3-dichloro-5,8-dihydro-6-methyl-1,4-naphthohydroquinone. (Third method)*

Ten grams of 6-methyl-2,3,4a,8a-tetrachloro-4a,5,8,8a-tetrahydro-1,4-naphthoquinone prepared as in Example 9 or 10, above, was dissolved in 100 ml. of glacial acetic acid. Five grams of zinc dust in small quantities was added to the solution over a period of about 20 minutes, during which time spontaneous and exothermic reaction took place (with the temperature of the solution rising from about 25° C. to about 60° C.). Addition of another 5 g. of zinc dust caused no further noticeable reaction. The reaction mixture was cooled and filtered to remove unreacted zinc and crude 2,3-dichloro-5,8-dihydro - 6 - methyl-1,4-naphthohydroquinone. The crude product was separated from the zinc by redissolving in 100 ml. of benzene. The yield was better than 50%, based upon the methyltetrachlorotetrahydronaphthoquinone. The product, dichlorodihydromethylnaphthohydroquinone was readily oxidized with chromic acid to form 2,3-dichloro-6-methyl-1,4-naphthoquinone.

EXAMPLE 14

*Preparation of 2,3-dichloro-6-methyl-5,6,7,8-tetrahydro-1,4-naphthohydroquinone*

Twelve and six-tenths grams of 6-methyl-2,3,4a,8a-tetrachloro-4a,5,8,8a-tetrahydro-1,4-naphthoquinone prepared as in Example 9 or 10, above, and 0.5 g. of platinum oxide catalyst were added to 58 ml. of glacial acetic acid and charged to a low pressure hydrogenation apparatus, which was then pressured to 44.8 lbs. per square inch with hydrogen at room temperature. After 51 minutes the hydrogen pressure had fallen 9.3 lbs. per square inch—which corresponded to a utilization of nearly 3 moles of hydrogen per mole of methyltetrachlorotetrahydronaphthoquinone. The reaction mixture was then removed from the apparatus, diluted with an additional 50 ml. of acetic acid and warmed to redissolve solids which had precipitated near the end of the hydrogenation reaction. The solution was filtered to remove the catalyst and diluted with water to precipitate crude white 2,3 - dichloro-6-methyl-5,6,7,8-tetrahydro-1,4-naphthohydroquinone. Further purification by recrystallization from carbon tetrachloride gave white needles, M. P. 119–120° C. Analyses: calculated ($C_{11}H_{12}O_2Cl_2$), C=53.46%, H=4.90%; found, C=53.85%, H=5.19%. The yield of dichloromethyltetrahydronaphthohydroquinone was 81%, based on methyltetrachlorotetrahydronaphthoquinone.

EXAMPLE 15

*Preparation of 6,7-dimethyl-2,3,4a,8a-tetrachloro-4a,5,8,8a-tetrahydro-1,4-naphthoquinone*

Twenty-four and six-tenths grams of chloranil, 9.8 g. of 2,3-dimethylbutadiene-1,3 and 80 ml. of benzene were placed in a bomb and allowed to react for 48 hours at 120° C. The bomb was then allowed to cool, the reaction mixture was removed from the bomb and concentrated by distillation, and the benzene replaced by methanol. After further concentration and cooling, a 74% yield of nearly colorless solid prisms of crude 6,7-dimethyl-2,3,4a,8a-tetrachloro-4a,5,8,8a-tetrahydro - 1,4-naphthoquinone precipitated from solution. The crude product was purified by repeated recrystallization from methanol and sublimation at 90° C. and 0.5 mm. Hg, to give a nearly colorless plate-like solid material, M. P. 96.5–98.5° C. Analyses: calculated ($C_{12}H_{10}O_2Cl_4$), C=43.93%, H=3.07%; found, C=44.23%, H=3.34%.

EXAMPLE 16

*Preparation of 6,7-dimethyl-2,3,4a,8a-tetrachloro-4a,5,8,-8a-tetrahydro-1,4-naphthoquinone. (Second method)*

The preparation described in Example 15 was repeated, except that the reaction was carried out at 110° C. for 38 hours. With this modification a yield of 96% and a conversion of 96% were obtained.

EXAMPLE 17

*Preparation of 2,3-dichloro-5,8-dihydro-6,7-dimethyl-1,4-naphthohydroquinone*

Five and three-quarters grams of 6,7-dimethyl-2,3,-4a,8a-tetrachloro-4a,5,8,8a-tetrahydro - 1,4 - naphthoquinone was dissolved in 40 ml. of glacial acetic acid. Four-tenths gram of 10% palladium-on-charcoal catalyst was added to the solution, and the mixture was charged to a low pressure hydrogenation apparatus and pressured to 33.5 lbs. per square inch with hydrogen at room temperature. After 15 minutes the hydrogen pressure had dropped 2.7 lbs. per square inch—which corresponded to a hydrogen utilization of about 1.9 moles per mole of dimethyltetrachlorotetrahydronaphthoquinone. The reaction mixture was removed from the apparatus, heated to dissolve the product which had precipitated during the hydrogenation, filtered to remove catalyst, leached with charcoal, then cooled and diluted with water to precipitate crude 2,3-dichloro-5,8-dihydro-6,7-dimethyl-1,4-naphthohydroquinone, with a yield of 83%, based upon dimethyltetrachlorotetrahydronaphthoquinone. Further purification by recrystallization from methanol and carbon tetrachloride gave nearly colorless crystalline needles, M. P. 224–226° C. Analyses: calculated ($C_{12}H_{12}O_2Cl_2$), C=55.62%, H=4.67%; found, C=55.70%, H= 4.58%.

EXAMPLE 18

*Preparation of 2,3-dichloro-5,8-dihydro-6,7-dimethyl-1,4-naphthohydroquinone. (Second method)*

Ten grams of 6,7 - dimethyl - 2,3,4a,8a - tetrachloro-4a,5,8,8a-tetrahydro-1,4-naphthoquinone prepared as in Example 15 or 16, above, was dissolved in 200 ml. of glacial acetic acid, to which there was then added 2.6 g. of zinc dust. Spontaneous exothermic reaction started immediately, as a result of which the temperature increased from 25° C. to 35° C. Two more 2.6 g. portions of zinc dust were added to the solution, with the temperature rising to 40° C. The mixture was then heated briefly at 70° C., cooled slightly, and filtered to obtain a mixture of zinc and crude solid product. Purification of the crude product by recrystallization from methanol gave nearly colorless crystalline solid, M. P. 221–223° C. Analyses: calculated ($C_{12}H_{12}O_2Cl_2$), C= 55.62%, H=4.67%; found, C=55.94%, H=4.73%.

EXAMPLE 19

*Preparation of 2,3-dichloro-6,7-dimethyl-5,6,7,8-tetrahydro-1,4-naphthohydroquinone*

Ten grams of 6,7 - dimethyl - 2,3,4a,8a - tetrachloro-4a,5, 8, 8a-tetrahydro-1,4-naphthoquinone and 0.5 gram of platinum oxide catalyst were added to 100 ml. of glacial acetic acid and charged to a low pressure hydrogenation apparatus, which was then pressured to 25.5 lbs. per square inch with hydrogen at room temperature. After 9 minutes the hydrogen pressure had fallen to 21 lbs. per square inch, at which time additional hydrogen was added to raise the pressure to 43.2 lbs. per square inch. After a total time of 2 hours and 47 minutes, approximately 3 moles of hydrogen had reacted per mole of dimethyltetrachlorotetrahydronaphthoquinone. The reaction mixture was then removed from the apparatus, filtered to remove the catalyst, and diluted with water to precipitate crude white powdered 2,3-dichloro-6,7-dimethyl - 5,6,7,8 - tetrahydro - 1,4 - naphthohydroquinone, M. P. 106.5–108.5° C., which was characterized by oxidation with $FeCl_3$ to form 2,3-dichloro-6,7-dimethyl-5,6,7,8-tetrahydro-1,4-naphthoquinone.

EXAMPLE 20

*Preparation of 5,7-dimethyl-2,3,4a,8a-tetrachloro-4a,5,8,8a-tetrahydro-1,4-naphthoquinone*

Thirty-one grams of chloranil and 12.3 g. of 2-methylpentadiene-1,3 were dissolved in 300 ml. of benzene, heated under reflux for 24 hours and then allowed to cool overnight. The resulting dark colored oil was heated to 50° C. and treated with a mixture of 25 g. of sodium dichromate dihydrate and 2 ml. of sulfuric acid in 20 ml. of water. The reaction mixture was then heated at 70–75° C. for 5 hours, water was added, and the mixture was allowed to cool overnight. The mixture was then washed with additional water and the benzene was distilled off, leaving a dark red oil, B. P. 117–137° C./0.2 mm. The dark red oil was allowed to stand for about 1 week, after which dilution with methanol caused precipitation of a white solid, M. P. 49–51° C. Recrystallization from methanol gave colorless prisms, M. P. 50.5–52.5° C. Analyses: calculated ($C_{12}H_{10}O_2Cl_4$), C=43.93%, H=3.07%, Cl=42.49%; found, C= 44.25%, H=3.42%, Cl= %. The yield and conversion of 5,7-dimethyl-2,3,4a,8a-tetrachloro-4a,5,8,8a-tetrahydro-1,4-naphthoquinone were each about 86%, based on chloranil.

EXAMPLE 21

*Preparation of 2,3-dichloro-5,7-dimethyl-5,6,7,8-tetrahydro-1,4-naphthohydroquinone*

Ten grams of 5,7 - dimethyl - 2,3,4a,8a - tetrachloro-4a,5,8,8a-tetrahydro-1,4-naphthoquinone was dissolved in 100 ml. of glacial acetic acid, to which there was then added 0.5 g. of platinum oxide catalyst. The mixture was charged to a low pressure hydrogenation apparatus and pressured with 45.7 lbs. per square inch of hydrogen at room temperature. Reaction began immediately, and in 27 minutes the hydrogen pressure had dropped 7.1 lbs. per square inch—corresponding to a hydrogen utilization of about 2.9 moles per mole of dimethyltetrachlorotetrahydronaphthoquinone. The reaction mixture was removed from the apparatus, filtered to separate the catalyst and diluted with about 10 times its volume of water, whereupon a yield of about 99% of crude off-white solid product was precipitated, M. P. 81.5–86.5° C. Analyses: calculated ($C_{12}H_{14}O_2Cl_2$), C=55.19%, H=5.40%; found, C=55.94%, H=5.46%.

EXAMPLE 22

*Preparation of 2,3-dichloro-5,8-dihydro-5,7-dimethyl-1,4-naphthohydroquinone*

Six and six-tenths grams of 5,7-dimethyl-2,3,4a,8a-tetrachloro-4a,5,8,8a-tetrahydro-1,4-naphthoquinone dissolved in benzene to make 50 ml. was diluted with 50 ml. of glacial acetic acid. Twenty grams of zinc dust was then added slowly in small portions, with vigorous shaking to prevent aggregation of the zinc. Spontaneous and mildly exothermic reaction caused the solution to become somewhat warm when the first portions of zinc were added. The reaction gave better than 64% yield of 2,3 - dichloro - 5,8 - dihydro-5,7-dimethyl-1,4-naphthohydroquinone which was characterized by its ready oxidation with chromic acid to give 2,3-dichloro-5,7-dimethyl-1,4-naphthoquinone.

EXAMPLE 23

*Preparation of 4a,5,8,8a-tetrahydro-2,6,8a-trichloro-1,4-naphthoquinone*

Nine grams of 2,6-dichloro-1,4-benzoquinone and 5 g. of chloroprene were dissolved in 50 ml. of benzene and heated at reflux for 65 hours and allowed to cool. The reaction gave a better than 70% yield of a mixture of 4a,5,8,8a - tetrahydro-2,6,8a-trichloro-1,4-naphthoquinone and 4a,5,8,8a - tetrahydro - 2,7,8a-trichloro-1,4-naphthoquinone, in which the 2,6,8a-trichloroisomer greatly predominated.

EXAMPLE 24

*Preparation of 2,6-dichloro-5,8-dihydro-1,4-naphthohydroquinone*

Fifty milliliters of glacial acetic acid was added to the benzene solution of 4a,5,8,8a-tetrahydro-2,6,8a-trichloro-1,4-naphthoquinone prepared in Example 25, above, and 3.25 g. of zinc dust was added in small proportions to the solution. Spontaneous exothermic reaction began immediately, causing the temperature of the mixture to rise from room temperature to about 50° C. Addition of 3.25 g. more of zinc dust caused an additional temperature rise to 65° C. The reaction mixture was allowed to stand overnight, during which time crystalline crude product precipitated from solution. The supernatant liquid was then decanted from the mixture of unreacted zinc and precipitated product, and the zinc was leached with hot glacial acetic acid to separate (by dissolution) the product from the zinc. The reaction resulted in a yield of better than 70% of a mixture of 2,6-dichloro-5,8-dihydro-1,4-naphthohydroquinone and 2,7-dichloro-5,8-dihydro-1,4-naphthohydroquinone, in which the 2,6-dichloro isomer greatly predominated. The product was characterized by oxidation with chromic acid to 2,6-dichloro-1,4-naphthoquinone and 2,7-dichloro-1,4-naphthoquinone.

EXAMPLE 25

*Preparation of 2,4a-dichloro-4a,5,8,8a-tetrahydro-1,4-naphthoquinone*

Ten grams of butadiene-1,3, 17.7 g. of 2,5-dichloro-1,4-benzoquinone and 80 ml. of benzene were charged to a bomb cooled with Dry Ice, allowed to react for 66 hours at 80° C., and then allowed to cool. The reaction mixture was removed and concentrated by distillation. When diluted with methanol, off-white crystalline needles precipitated. Further purification by treatment of the methanol solution with charcoal, recrystallization from methanol and drying under vacuum gave faintly yellow colored needles of 2,4a-dichloro-4a,5,8,8a-tetrahydro-1,4-naphthoquinone, M. P. 84–86° C. Analyses: calculated ($C_{10}H_8Cl_2O_2$), C=51.98%, H=3.49%; found, C=52.42%, H=3.80%. The yield of product was 83%, based upon dichlorobenzoquinone reactant.

EXAMPLE 26

*Preparation of 2-chloro-5,6,7,8-tetrahydro-1,4-naphthohydroquinone*

Seven grams of 2,4a-dichloro-4a,5,8,8a-tetrahydro-1,4-naphthoquinone prepared as in Example 27, above, was dissolved in 50 ml. of glacial acetic acid, placed along with 0.4 g. of 10% palladium-on-charcoal catalyst in a low pressure hydrogenation apparatus, and pressured with 35.3 lbs. per square inch of hydrogen at room temperature. The reaction mixture was allowed to stand under hydrogen pressure for two days and was then removed and filtered to remove catalyst. Upon dilution to 250 ml. with water and cooling below 0° C., a light tan crude solid product was precipitated and filtered from the liquid. Further purification by treatment with charcoal, recrystallization from carbon tetrachloride, and drying under vacuum gave very light tan needles, M. P. 141–142° C. Analyses: calculated ($C_{10}H_{11}O_2Cl$), C=60.46%, H=5.58%; found, C=60.16%, H=5.62%. The yield of 2-chloro-5,6,7,8-tetrahydro-1,4-naphthohydroquinone was 65%, based on dichlorotetrahydronaphthoquinone.

EXAMPLE 27

*Preparation of 2-chloro-5,8-dihydro-1,4-naphthohydroquinone*

One hundred milliliters of a solution containing about 4.5 g. of 2,4a-dichloro-4a,5,8,8a-tetrahydro-1,4-naphthoquinone, about 48 ml. of benzene, and remainder glacial acetic acid, was treated with 3.3 g. of zinc dust (added in small portions). Spontaneous exothermic reaction, which caused the temperature of the solution to rise to about 65° C., resulted in a better than 70% yield of 2-chloro-5,8-dihydro-1,4-naphthohydroquinone, which was characterized by oxidation with chromic acid to form 2-chloro-1,4-naphthoquinone.

EXAMPLE 28

*Preparation of 4a,5,8,8a-tetrahydro-2,4a,7-trichloro-1,4-naphthoquinone*

Seventeen and seven-tenths grams of 2,5-dichloro-1,4-benzoquinone, and 8.8 g. of chloroprene were dissolved in 100 ml. of benzene and heated at reflux for 65 hours. After cooling and diluting (with benzene) to 125 ml., solid white plates of 4a,5,8,8a-tetrahydro-2,4a,7-trichloro-1,4-naphthoquinone, M. P. 145–147° C., precipitated from solution.

EXAMPLE 29

*Preparation of 2,7-dichloro-5,8-dihydro-1,4-naphthohydroquinone*

Two grams of 4a,5,8,8a-tetrahydro-2,4a,7-trichloro-1,4-naphthoquinone was dissolved in 40 ml. of glacial acetic acid to which 4 g. of zinc dust was added slowly in small proportions. The mixture was then heated to 50–60° C. for about 15 minutes and cooled, giving a 73% yield of 2,7-dichloro-5,8-dihydro-1,4-naphthohydroquinone, which was characterized by oxidation with chromic acid to 2,7-dichloro-1,4-naphthoquinone.

EXAMPLE 30

*Preparation of 2-chloro-5,6,7,8-tetrahydro-1,4-naphthohydroquinone. (Second method)*

Six grams of 4a,5,8,8a-tetrahydro-2,4a,7-trichloro-1,4-naphthoquinone was dissolved in 50 ml. of glacial acetic acid and placed with 0.3 g. of platinum oxide catalyst in a low pressure hydrogenation apparatus, which was then pressured with 42.3 lbs. per square inch of hydrogen at room temperature. After 1 hour and 20 minutes the hydrogen pressure had dropped 6.5 lbs. per square inch— which corresponded to a hydrogen utilization of about 3.6 moles per mole of tetrahydrotrichloronaphthoquinone. The reaction mixture was removed from the apparatus, filtered to remove catalyst, diluted with 10 volumes of water and allowed to stand overnight. Subsequent filtration gave a yield of 68% of white solid 2-chloro-5,6,7,8-tetrahydro-1,4-naphthohydroquinone, M. P. 139–141° C.

The aromatic halohydroquinones of the present invention are useful as fungicides, herbicides and similar biological toxicants. They are further useful as intermediates in the preparation of various halonaphthoquinones to which they can be very readily oxidized by well-known oxidation procedures. The resulting, halonaphthoquinone oxidation products are also useful as fungicides, herbicides, and the like.

I claim:

1. The method of preparing an aromatic eso-halo-1,4-hydroquinone having a cycloaliphatic ring fused thereto through the 5,6-positions, which method comprises reductively dehalogenating a 5,6-dihydro-eso-polyhalo-1,4-benzoquinone having a cycloaliphatic ring fused thereto through the 5,6-positions, at least one of the halogen atoms being a vinyl halogen and at least one of the halogen atoms being an angular substituent in cis-relationship with the other angular substituent.

2. The process of claim 1 wherein the halogen atoms are chlorine atoms.

3. The method of preparing a 5,8-dihydro-1,4-naphthohydroquinone containing at least one nuclear halogen atom attached to the aromatic ring, which method comprises reductively dehalogenating a 4a,5,8,8a-tetrahydro-1,4-naphthoquinone containing at least two halogen atoms on nuclear carbon atoms which are in alpha positions to a carbonyl group, at least one of said halogens being a vinyl halogen and at least one of said halogens being an angular substituent in cis-relationship with the other angular substituent.

4. The method of preparing a 2,3-dihalo-5,8-dihydro-1,4-naphthohydroquinone, which method comprises reductively dehalogenating a 2,3,4a,8a-tetrahalo-4a,5,8,8a-tetrahydro-1,4-naphthoquinone having the 4a and 8a halogen atoms in a cis-relationship with each other.

5. The method of preparing a 2-halo-5,8-dihydro-1,4-naphthohydroquinone which method comprises reductively dehalogenating a 2,4a-dihalo-4a,5,8,8a-tetrahydro-1,4-naphthoquinone in which the 4a-halogen atom and the other angular substituent are in a cis-relationship with each other.

6. The method of preparing a 2-halo-5,8-dihydro-1,4-naphthohydroquinone which method comprises reductively dehalogenating a 2,8a-dihalo-4a,5,8,8a-tetrahydro-1,4- naphthoquinone in which the 8a-halogen atom and the other angular substituent are in a cis-relationship with each other.

7. The method of preparing a 2,3-dichloro-5,8-dihydro-1,4-naphthohydroquinone which method comprises reducing a 2,3,4a,8a-tetrachloro-4a,5,8,8a-tetrahydro-1,4-naphthoquinone in which the 4a and 8a-chlorine atoms are in a cis-relationship with each other with a reducing couple comprising a metallic element higher than hydrogen in the electromotive series and an acid.

8. The method of preparing an aromatic eso-halo-1,4-hydroquinone having a cycloaliphatic ring fused thereto through the 5,6-positions, which method comprises catalytically hydrogenating a 5,6-dihydro-eso-polyhalo-1,4-benzoquinone having a cycloaliphatic ring fused thereto through the 5,6-positions, at least one of the halogen atoms being a vinyl halogen and at least one of the halogen atoms being an angular substituent in cis-relationship with the other angular substituent.

9. The method of preparing a 2-chloro-5,8-dihydro-1,4-naphthohydroquinone, which method comprises reductively dehalogenating a 2,4a-dichloro-4a,5,8,8a-tetrahydro-1,4-naphthoquinone, the angular chlorine atom being in cis-relationship with the angular hydrogen atom, the reductive dehalogenation being carried out with hydrogen in the presence of a palladium catalyst.

10. The method of preparing a 2-chloro-5,6,7,8-tetrahydro-1,4-naphthohydroquinone which method comprises reductively dehalogenating a 2,8a-dichloro-4a,5,8,8a-tetrahydro-1,4-naphthoquinone, the angular chlorine atom being in cis-relationship with the angular hydrogen atom, the reductive dehalogenation being carried out with hydrogen in the presence of a platinum dioxide catalyst.

11. 5,6,7,8-tetrahydro-1,4-naphthohydroquinones containing at least 1 nuclear halogen atom attached to the aromatic ring.

12. The method of preparing a 5,8-dihydro-1,4-naphthohydroquinone containing at least one nuclear halogen atom attached to the aromatic ring, which method comprises catalytically hydrogenating a 4a,5,8,8a-tetrahydro-1,4-naphthoquinone containing at least two halogen atoms on nuclear carbon atoms which are in alpha positions to a carbonyl group, at least one of said halogens being a vinyl halogen and at least one of said halogens being an angular substituent in cis-relationship with the other angular substituent.

References Cited in the file of this patent

UNITED STATES PATENTS

| | | |
|---|---|---|
| 1,967,862 | Carothers et al. | July 24, 1934 |
| 2,176,417 | Britton et al. | Oct. 17, 1939 |
| 2,198,374 | Bruson et al. | Apr. 23, 1940 |
| 2,584,140 | Segel et al. | Feb. 5, 1952 |